No. 722,674. PATENTED MAR. 17, 1903.
J. R. CARTER.
MECHANICAL MOVEMENT.
APPLICATION FILED OCT. 6, 1902.
NO MODEL.
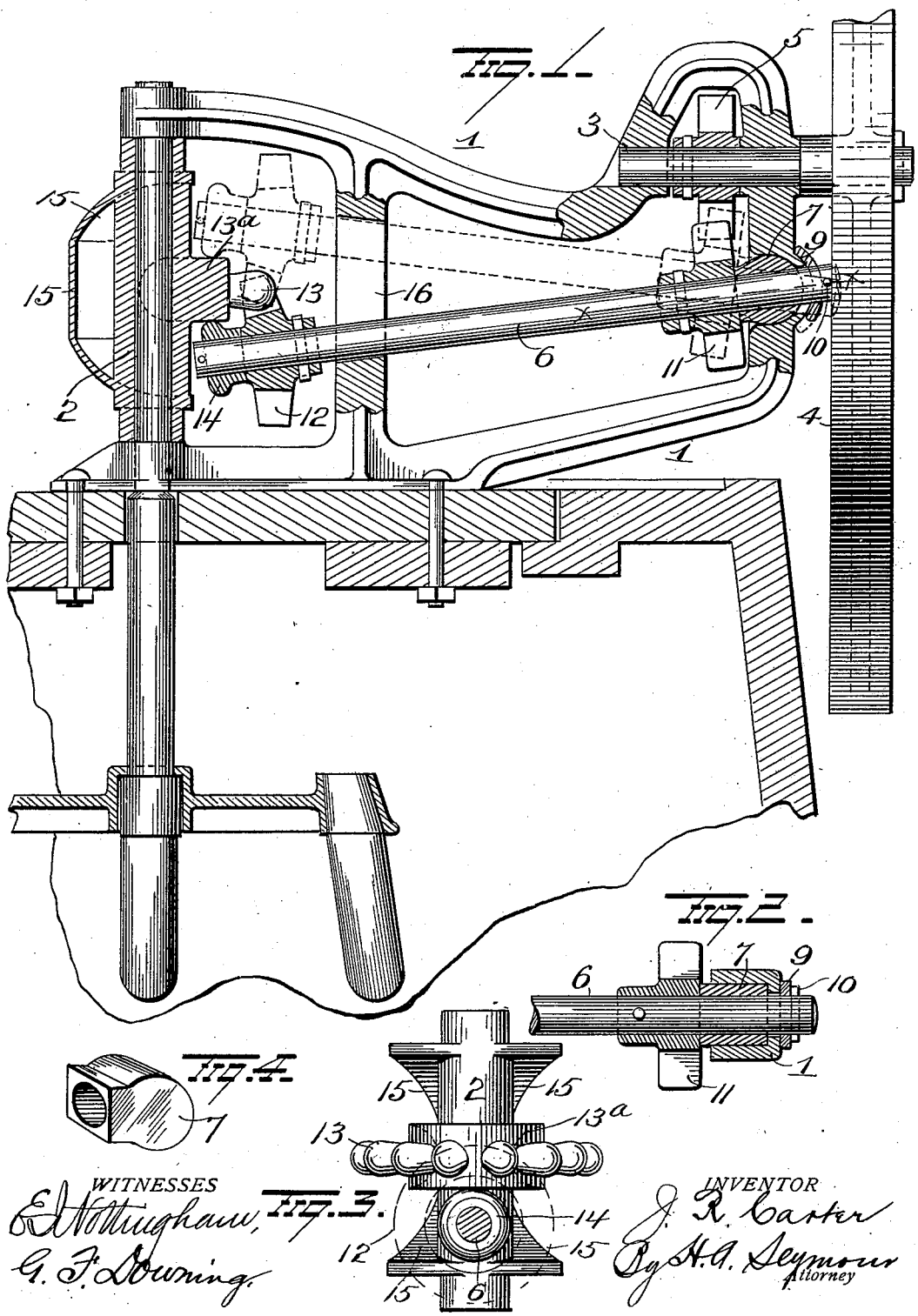
WITNESSES
E. Nottingham
G. F. Downing
INVENTOR
J. R. Carter
By H. A. Seymour
Attorney

UNITED STATES PATENT OFFICE.

JOHN R. CARTER, OF AUGUSTA, KENTUCKY.

MECHANICAL MOVEMENT.

SPECIFICATION forming part of Letters Patent No. 722,674, dated March 17, 1903.

Application filed October 6, 1902. Serial No. 126,184. (No model.)

*To all whom it may concern:*

Be it known that I, JOHN R. CARTER, of Augusta, in the county of Bracken and State of Kentucky, have invented certain new and useful Improvements in Mechanical Movements; and I do hereby declare the following to be a full, clear, and exact description of the invention, such as will enable others skilled in the art to which it appertains to make and use the same.

My invention relates to an improved mechanical movement, and more particularly to improved gearing for rotating the dasher of a washing-machine alternately in opposite directions, the object of the invention being to provide improvements of this character in which a hand-wheel or other rotary driver when continuously rotated in either direction will through the medium of my improvements alternately rotate a driven shaft in opposite directions.

With this object in view the invention consists in certain novel features of construction and combinations and arrangements of parts, as will be more fully hereinafter described, and pointed in the claims.

In the accompanying drawings, Figure 1 is a view, partly in section, illustrating my improvements. Fig. 2 is a view in section on the line $x\ x$ of Fig. 1, and Figs. 3 and 4 are views illustrating details of construction.

1 represents a frame into which projects a vertical driven shaft supported in suitable bearings in the frame and has keyed thereto and held between the bearings against longitudinal movement a hub or cylinder 2, which will be more fully hereinafter described. At one end of the frame alined bearings are provided for a short shaft 3, on which a hand-wheel 4 or other driving device is secured, and a gear-wheel 5 is fixed upon this shaft, as shown. Below shaft 3 is a shaft 6, mounted in a pivoted bearing 7, which latter comprises a sleeve rounded at one end and having flat parallel sides to fit a correspondingly-shaped socket in frame 1 to permit vertical pivotal movement of the shaft without interfering with its free rotary motion. The end of shaft 6 projects through bearing 7 and frame 1 and has mounted thereon a concave washer 9 to fit the rounded outer face of the frame and secured to said shaft by a pin 10. On this shaft 6, near bearing 7, a gear-wheel 11 is secured and meshes with gear 5, receiving motion therefrom. The opposite end of shaft 6 has a gear-wheel 12 thereon to mesh with a horizontal rack 13 on a circular extension $13^a$ of cylinder 2, and a roller 14 is mounted to revolve upon the extreme end of shaft 6 to move in guides 15 on cylinder 2, as will now be explained. On the cylinder, at each end of rack 13, curved guides 15 are located. These guides receive roller 14 and serve to hold gear 12 in proper relative position to the rack while moving around the ends thereof, and a slotted standard 16 guides shaft 6, supporting it in its lowest position, limiting its upward movement, and preventing lateral movement thereof, as will be readily understood.

In operation motion is transmitted to gear 11 and shaft 6 by means of gear 5, shaft 3, and hand-wheel 4, to rotate shaft 6 continuously in either direction. This continuous rotary motion is also imparted to gear 12, which engaging the lower face of rack 13 revolves the cylinder 2 in one direction until the end of the rack is reached, when roller 14 will move into one curved guide 15 and guide the gear 12 around the end tooth of the rack to the top thereof, pivotal bearing 7 permitting the vertical pivotal movement of the shaft. When the gear 12 is on top the rack, roller 14 will run on extension $13^a$, and the gear will turn the cylinder in the reverse direction and will ride around the opposite end of the rack to below the same, the slotted standard 16 serving to hold the gear 12 in proper relative position to the rack.

A great many changes might be made in the general arrangement of parts—as, for instance, gears 5 and 11 might be side by side instead of one above the other, and different forms of gears and different mountings or bearings might be provided for the shafts—without departing from my invention, and hence I do not confine myself to the precise construction set forth, but consider myself at liberty to make such slight changes and alterations as fairly fall within the spirit and scope of my invention.

Having fully described my invention, what I claim as new, and desire to secure by Letters Patent, is—

1. The combination with a shaft pivotally supported at one end, and gearing coöperating directly with said shaft for driving it, of a driven shaft, a rack carried thereby, a gear-wheel carried by the free end of the pivotally-supported shaft and meshing with the rack and means for guiding said last-mentioned gear-wheel around the rack.

2. The combination with a driven shaft, of a rack thereon, a shaft, a gear on said shaft meshing with said rack, a pivoted bearing for the other end of said shaft, means for guiding the gear around the ends of the rack, another gear-wheel on said shaft and means for transmitting motion to said last-mentioned gear-wheel.

3. The combination with a driven shaft, of a rack thereon, a shaft pivotally supported near one end and a gear on said shaft meshing with said rack, means for guiding the gear around the ends of the rack, another gear secured directly to the pivotally-mounted shaft near its pivotal point, and a driving-gear meshing therewith.

4. The combination with a driven shaft, of a cylinder or hub secured thereon and held against vertical movement, a horizontal rack on the cylinder or hub, a shaft supported near one end to rotate in a pivoted bearing, a gear-wheel near the free end of the shaft meshing with the rack, means for guiding the gear-wheel around the ends of the rack to the top or bottom thereof, a gear on the shaft near the pivotal support, and a drive-gear meshing therewith to transmit motion to said shaft.

5. The combination with a driven shaft, of a cylinder or hub secured thereon and held against vertical movement, a horizontal rack on the cylinder or hub, a rotary shaft having vertical movement, a guide for said shaft holding the same against lateral movement and limiting its vertical movement, a gear on the shaft meshing with the rack, another gear on said shaft near its pivotal point and means for driving said last-mentioned gear.

In testimony whereof I have signed this specification in the presence of two subscribing witnesses.

JOHN R. CARTER.

Witnesses:
S. W. FOSTER,
GEO. F. DOWNING.